(12) United States Patent
Messer et al.

(10) Patent No.: US 9,792,353 B2
(45) Date of Patent: *Oct. 17, 2017

(54) METHOD AND SYSTEM FOR PROVIDING SPONSORED INFORMATION ON ELECTRONIC DEVICES

(71) Applicant: Samsung Electronics Co., Ltd., Suwon-si, Gyeonggi-do (KR)

(72) Inventors: Alan Messer, Los Gatos, CA (US); Anugeetha Kunjithapatham, Millbrae, CA (US); Mithun Sheshagiri, Navi-Mumbai (IN); Phuong Nguyen, San Jose, CA (US); Priyang Rathod, Mountain View, CA (US)

(73) Assignee: Samsung Electronics Co. Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/218,846

(22) Filed: Mar. 18, 2014

(65) Prior Publication Data

US 2014/0201230 A1    Jul. 17, 2014

Related U.S. Application Data

(63) Continuation of application No. 11/825,161, filed on Jul. 5, 2007, now Pat. No. 8,732,154.

(Continued)

(51) Int. Cl.
*G06F 7/00*    (2006.01)
*G06F 17/30*   (2006.01)
(Continued)

(52) U.S. Cl.
CPC .... *G06F 17/3064* (2013.01); *G06F 17/30864* (2013.01); *G06Q 30/02* (2013.01);
(Continued)

(58) Field of Classification Search
CPC .......... G06F 17/3064; G06F 17/30864; G06F 17/3097; G06F 17/30038; G06F 17/30268; G06F 17/30752; G06F 17/3082
(Continued)

(56) References Cited

U.S. PATENT DOCUMENTS 5,945,988 A    8/1999  Williams et al.
5,948,061 A    9/1999  Merriman et al.
(Continued)

FOREIGN PATENT DOCUMENTS

KR    10-2002-0005147 A    1/2002
KR    10-2002-0006810 A    1/2002
(Continued)

OTHER PUBLICATIONS

U.S. Non-Final Office Action for U.S. Appl. No. 11/969,837 mailed Sep. 18, 2014.
(Continued)

*Primary Examiner* — Mohammed R Uddin
(74) *Attorney, Agent, or Firm* — Sherman IP LLP; Kenneth L. Sherman; Hemavathy Perumal

(57) ABSTRACT

A system implementing a method for providing sponsored information on an electronic device determines information of interest to the user as relevant information, accesses sponsored information, and provides sponsored information based on said relevant information.

20 Claims, 6 Drawing Sheets

Related U.S. Application Data

(60) Provisional application No. 60/904,004, filed on Feb. 28, 2007.

(51) Int. Cl.
  *G06Q 30/02* (2012.01)
  *H04L 29/06* (2006.01)
  *H04L 29/08* (2006.01)

(52) U.S. Cl.
  CPC .............. *H04L 29/06* (2013.01); *H04L 67/02* (2013.01); *H04L 67/20* (2013.01)

(58) Field of Classification Search
  USPC ................... 707/708, 736, 771, 999.003
  See application file for complete search history.

(56) References Cited

U.S. PATENT DOCUMENTS

| | | | |
|---|---|---|---|
| 5,974,406 A | 10/1999 | Bisdikian et al. | |
| 5,983,237 A | 11/1999 | Jain et al. | |
| 5,995,959 A | 11/1999 | Friedman et al. | |
| 6,151,603 A | 11/2000 | Wolfe | |
| 6,230,324 B1* | 5/2001 | Tomita et al. ................... | 725/51 |
| 6,334,127 B1 | 12/2001 | Bieganski et al. | |
| 6,438,579 B1 | 8/2002 | Hosken | |
| 6,721,955 B2 | 4/2004 | Khoo et al. | |
| 6,774,926 B1 | 8/2004 | Ellis et al. | |
| 7,055,165 B2 | 5/2006 | Connelly | |
| 7,110,998 B1 | 9/2006 | Bhandari et al. | |
| 7,162,473 B2 | 1/2007 | Dumais et al. | |
| 7,165,080 B2 | 1/2007 | Kotcheff et al. | |
| 7,243,362 B2 | 7/2007 | Swix et al. | |
| 7,389,224 B1 | 6/2008 | Elworthy | |
| 7,389,307 B2 | 6/2008 | Golding | |
| 7,424,678 B2 | 9/2008 | Sezan et al. | |
| 7,552,193 B2 | 6/2009 | Carro | |
| 7,590,998 B2 | 9/2009 | Hanley | |
| 7,689,510 B2 | 3/2010 | Lamkin et al. | |
| 7,739,271 B2 | 6/2010 | Cook et al. | |
| 7,761,885 B2 | 7/2010 | Labrou et al. | |
| 7,778,874 B1* | 8/2010 | Saunders ................... | 705/14.67 |
| 7,882,262 B2 | 2/2011 | Bhattacharya et al. | |
| 7,882,523 B2 | 2/2011 | Utsuki et al. | |
| 8,001,561 B2 | 8/2011 | Gibbs et al. | |
| 8,001,568 B2 | 8/2011 | Thurston et al. | |
| 8,010,536 B2 | 8/2011 | Nemeth et al. | |
| 8,015,192 B2 | 9/2011 | Rathod et al. | |
| 8,042,136 B2 | 10/2011 | Narahara et al. | |
| 8,079,046 B2 | 12/2011 | Ali | |
| 8,209,724 B2 | 6/2012 | Rathod et al. | |
| 8,230,364 B2 | 7/2012 | Trepess | |
| 8,233,775 B2 | 7/2012 | Kunii et al. | |
| 8,364,521 B2 | 1/2013 | Ramer et al. | |
| 8,364,670 B2 | 1/2013 | Peckover | |
| 8,615,719 B2 | 12/2013 | Ramer et al. | |
| 2001/0003214 A1* | 6/2001 | Shastri .............. | G06F 17/30796 725/109 |
| 2001/0023433 A1 | 9/2001 | Natsubori et al. | |
| 2002/0004839 A1* | 1/2002 | Wine et al. ................... | 709/231 |
| 2002/0022491 A1 | 2/2002 | McCann et al. | |
| 2002/0053084 A1 | 5/2002 | Escobar et al. | |
| 2002/0083464 A1* | 6/2002 | Tomsen ............... | H04N 5/4401 725/112 |
| 2002/0124263 A1 | 9/2002 | Yokomizo | |
| 2003/0020744 A1 | 1/2003 | Ellis et al. | |
| 2003/0066090 A1 | 4/2003 | Traw et al. | |
| 2003/0126597 A1 | 7/2003 | Darby et al. | |
| 2003/0221198 A1* | 11/2003 | Sloo ............... | 725/136 |
| 2004/0073924 A1 | 4/2004 | Pendakur | |
| 2004/0088375 A1 | 5/2004 | Sethi et al. | |
| 2004/0243466 A1* | 12/2004 | Trzybinski et al. ............ | 705/14 |
| 2004/0268419 A1 | 12/2004 | Danker et al. | |
| 2005/0080764 A1 | 4/2005 | Ito | |
| 2005/0096978 A1 | 5/2005 | Black | |
| 2005/0120391 A1 | 6/2005 | Haynie et al. | |
| 2005/0177555 A1 | 8/2005 | Alpert et al. | |
| 2005/0209874 A1* | 9/2005 | Rossini ............... | 705/1 |
| 2005/0216547 A1* | 9/2005 | Foltz-Smith et al. ......... | 709/200 |
| 2006/0047701 A1* | 3/2006 | Maybury et al. ........... | 707/104.1 |
| 2006/0066573 A1 | 3/2006 | Matsumoto | |
| 2006/0080321 A1 | 4/2006 | Horn et al. | |
| 2006/0084430 A1 | 4/2006 | Ng | |
| 2006/0123455 A1 | 6/2006 | Pai et al. | |
| 2006/0135156 A1* | 6/2006 | Malu et al. ................. | 455/432.3 |
| 2006/0212897 A1* | 9/2006 | Li et al. .......................... | 725/32 |
| 2006/0218035 A1* | 9/2006 | Park ........................ | G06Q 30/02 705/14.53 |
| 2007/0038514 A1 | 2/2007 | Patterson et al. | |
| 2007/0060109 A1* | 3/2007 | Ramer et al. .............. | 455/414.1 |
| 2007/0060136 A1 | 3/2007 | Ramer et al. | |
| 2007/0061198 A1 | 3/2007 | Ramer et al. | |
| 2007/0061331 A1* | 3/2007 | Ramer et al. ................... | 707/10 |
| 2007/0061858 A1 | 3/2007 | Ura | |
| 2007/0067267 A1* | 3/2007 | Ives ................................. | 707/3 |
| 2007/0143176 A1* | 6/2007 | Nong et al. ..................... | 705/14 |
| 2007/0143266 A1* | 6/2007 | Tang et al. ......................... | 707/3 |
| 2007/0214123 A1 | 9/2007 | Messer et al. | |
| 2007/0265857 A1* | 11/2007 | Shivaji Rao ...................... | 705/1 |
| 2007/0266403 A1 | 11/2007 | Ou et al. | |
| 2008/0022309 A1 | 1/2008 | Begeja et al. | |
| 2008/0046312 A1 | 2/2008 | Shany et al. | |
| 2008/0046945 A1* | 2/2008 | Hanley ........................ | 725/112 |
| 2008/0195582 A1* | 8/2008 | Yu et al. ........................... | 707/3 |
| 2008/0221989 A1 | 9/2008 | Messer et al. | |
| 2008/0235393 A1 | 9/2008 | Kunjithapatham et al. | |
| 2008/0250010 A1 | 10/2008 | Rathod et al. | |
| 2009/0030800 A1* | 1/2009 | Grois .............................. | 705/14 |
| 2009/0125951 A1 | 5/2009 | Agricola et al. | |
| 2010/0122294 A1 | 5/2010 | Craner | |

FOREIGN PATENT DOCUMENTS

| | | | |
|---|---|---|---|
| KR | 10-2004-0052339 A | 6/2004 | |
| KR | 10-2006-0027226 A | 3/2006 | |
| WO | 01/37465 A2 | 5/2001 | |
| WO | 02/43310 A2 | 5/2002 | |
| WO | 03/038563 A2 | 5/2003 | |
| WO | 2005/055196 A2 | 6/2005 | |
| WO | 2007/004110 A2 | 1/2007 | |

OTHER PUBLICATIONS

U.S. Non-Final Office Action for U.S. Appl. No. 11/969,837 mailed Apr. 29, 2014.

Moraveji, N. et al., "DynaLine: A Non-Disruptive TV User Interface for Passive Browsing of Internet Video." Microsoft Research Technical Report, 2006, pp. 1-4.

Miyamori, H. et al., "Webified Video: Media Conversion from TV Programs to Web Content for Cross-Media Information Integration," Proceedings of the 16th International Conference on Database and Expert Systems Applications, 2005, pp. 176-185, Springer-Verlag, Berlin, Heidelberg.

Copernic Inc., Copernic Search Engine for your PC, http://www.copernic.com, downloaded Sep. 19, 2008, 1 page, US.

Realnetworks, Inc., http://www.real.com, downloaded Sep. 19, 2008, 1 page, US.

Microsoft Corporation, Microsofl Windows Media Player 10, http://www.microsofl.com/windows/windowsmedialmpl0, downloaded Sep. 19, 2008, 1 page, US.

AOL LLC. http://www.aol.com, downloaded Sep. 19, 2008, pp. 1-2, United States.

Ask Search Engine, http://www.ask.com, downloaded Sep. 19, 2008, pp. 1, United States.

Google Search Engine AdSense, http://www.google.com/adsense, download date, Sep. 24, 2008, United States.

Google Search Engine AdWords, http://www.adwords.google.com, download date, Sep. 24, 2008, United States.

Allen, C. et al, "Internet World Guide to one-on-one web marketing," Internet World, Jan. 1, 1998, pp. 235-265, Mecklermedia, Westport, CT.

(56) References Cited

OTHER PUBLICATIONS

Extended European Search Report in EP Application No. 08152295 on Jul. 21, 2009, 7 pages.
Apple Inc., Apple iTunes, http://www.apple.com/itunes/, Apr. 28, 2003, 2 pages, United States.
Babaguchi, N. et al., "Intermodal Collaboration: A Strategy for Semantic Content Analysis for Broadcasted Sports Video," IEEE International Conference on Image Processing, Sep. 2003, pp. 13-16, vol. 1, Barcelona, Spain.
Brill, E., "A Simple Rule-Based Part of Speech Tagger," Third Conference on Applied Natural Language Processing, Mar. 1992, pp. 152-155, Trento, Italy.
Google Inc., Googie Search Engine, http://www.google.com, Aug. 1998, 1 page, United States.
Google Inc., Googie Desktop Search, http://desktop.google.com, Oct. 15, 2004, 1 page, United States.
Henzinger, M. et al., "Query-Free News Search," Proceedings of the 12th International Conference on World Wide Web, May 20-24, 2003, Budapest, Hungary, ACM Press, New York, NY, May 2003, pp. 1-10, United States.
Livingston, K. et al., "Beyond Broadcast: A Demo," Proceedings of the 8th international Conference on Intelligent User Interfaces, Jan. 12-15, 2003, Miami, Florida, USA, ACM Press, New York, NY, Jan. 2003, p. 325, United States.
Microsoft Corporation, Microsoft Windows Media Player, http://www.microsoft.com/windows/windowsmedia/, Feb. 1999, 1 page, United States.
Microsoft Corporation, MSN TV, http://www.webtv.com/pc, Feb. 2006, 1 page, United States.
Opera Software ASA, Opera Browser for Devices, http://www.opera.com/products/devices/, Mar. 2006, 2 pages, United States.
Rau, L.F. et al, "Domain-Independent Summarization of News," In Summarizing Text for Intelligent Communication, Jun. 1994, pp. 71-75, Dagstuhl, Germany.
Spalti, M., "Finding and Managing Web Content with Copernic 2000," Library Computing, vol. 18, No. 3, Westport, Sep. 2000, pp. 217-221, United States.
Tjondronegoro, D. et al., "Extensible Detection and Indexing of Highlight Events in Broadcasted Sports Video," Proceedings of the 29th Australasian Computer Science Conference, Hobart, Tazmania, Australia, Conferences in Research and Practice in Information Technology, vol. 48, Australasian Computer Society Inc., Jan. 2006, pp. 1-1 0, Sydney, Australia.
Wachman, J. et al., "Tools for Browsing a TV Situation Comedy Based on Content Specific Attributes," Multimedia Tools and Applications, vol. 13, No. 3, Kluwer Academic Publishers, Boston, Massachusetts, Mar. 2001, pp. 255-284, United States.
Yahoo! Inc., http://search.yahoo.com, Dec. 1998, 1 page, United States.
Zhuang, Y. et al, "Applying Semantic Association to Support Content-Based Video Retrieval," International Workshops on Very Low Bitrate Video Coding (VLBV 1998), Oct. 1998, pp. 1-4, United States.
Livingston, K. et al., "Beyond Broadcast," 8th International Conference on Intelligent User Interfaces, Jan. 2003, pp. 260-262, Association for Computing Machinery, New York, NY.
Notification of Transmittal of the International Search Report and the Written Opinion of the International Searching Authority, dated Aug. 20, 2008; International Search Report and Written Opinion of the International Searching Authority for International Application No. PCT/KR2008/001941, 10 pages.
Notification of Transmittal of the International Search Report and the Written Opinion of the International Searching Authority for International Appiication No. PCT/KR2008/001558, dated Jun. 26, 2008, 10 pages.
Notification of Transmittal of the International Search Report and the Written Opinion of the International Searching Authority; Internationai Search Report and Written Opinion of the International Searching Authority for Application No. PCT/KR2008/000537 dated May 15, 2008, 16 pages.
Office Action in U.S. Appl. No. 11/825,161 mailed Jul. 22, 2009.
Office Action in U.S. Appl. No. 11/825,161 mailed Jan. 13, 2010.
Office Action in U.S. Appl. No. 11/969,837 dated Nov. 9, 2010.
Office Action in U.S. Appl. No. 11/969,837 dated Apr. 13, 2011.
Office Action dated Aug. 12, 2011 from U.S. Appl. No. 11/969,837.
Office Action dated Sep. 28, 2011 from U.S. Appl. No. 11/825,161.
Final Office Action dated Jan. 30, 2012 from U.S. Appl. No. 11/969,837.
Final Office Action dated Feb. 23, 2012 from U.S. Appl. No, 11/825,161.
U.S. Non-Final Office Action dated Jan. 28, 2013 from U.S. Appl. No. 11/825,161.
U.S. Non-Final Office Action dated Dec. 20, 2010 from U.S. Appl. No. 12/120,203.
U.S. Final Office Action dated Jun. 9, 2011 from U.S. Appl. No. 12/120,203.
U.S. Advisory Action dated Aug. 12, 2011 from U.S. Appl. No. 12/120,203.
U.S. Non-Final Office Action dated Dec. 8, 2011 from U.S. Appl. No. 12/120,203.
U.S. Final Office Action dated Mar. 27, 2012 from U.S. Appl. No. 12/120,203.
U.S. Advisory Action dated Jun. 22, 2012 from U.S. Appl. No. 12/120,203.
U.S. Non-Final Office Action dated Nov. 20, 2012 from U.S. Appl. No. 12/120,203.
U.S. Final Office Action dated May 8, 2013 from U.S. Appl. No. 12/120,203.
U.S. Advisory Action dated Jul. 17, 2013 from U.S. Appl. No. 12/120,203.
U.S. Final Office Action for U.S. Appl. No. 11/825,161 mailed Aug. 2, 2013.
U.S. Non-Final Action for U.S. Appl. No. 12/120,203 mailed Sep. 25, 2013.
U.S. Advisory Action for U.S. Appl. No. 11/825,161 mailed Oct. 9, 2013.
U.S. Notice of Allowance for U.S. Appl. No. 11/825,161 mailed Dec. 18, 2013.
U.S. Notice of Allowance for U.S. Appl. No. 12/120,203 mailed Mar. 13, 2014.

* cited by examiner

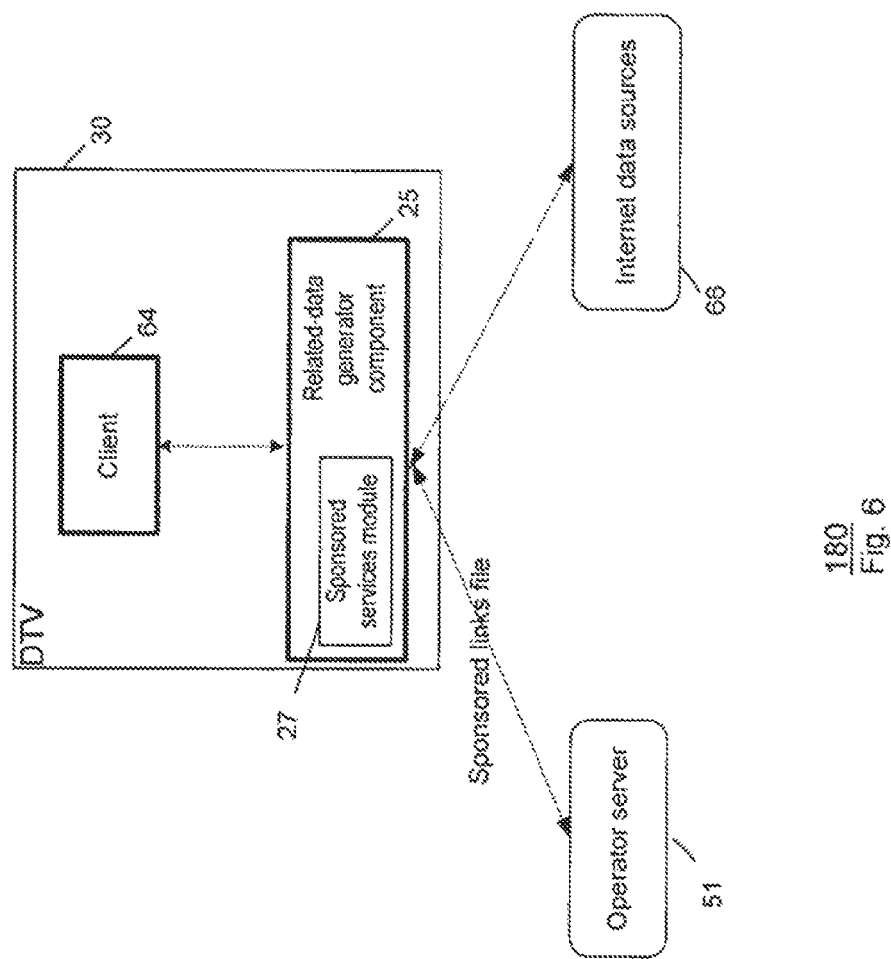

METHOD AND SYSTEM FOR PROVIDING SPONSORED INFORMATION ON ELECTRONIC DEVICES

CROSS-REFERENCE TO RELATED APPLICATIONS

This application is a continuation of U.S. patent application Ser. No. 11/825,161, filed on Jul. 5, 2007, which in turn claims priority to U.S. Provisional Patent Application Ser. No. 60/904,004, filed on Feb. 28, 2007, both incorporated herein by reference.

BACKGROUND OF THE INVENTION

1. Field of the Invention

The present invention relates to providing information of potential interest to users, and in particular to providing information to of potential interest to users via electronic devices in a network.

2. Description of the Related Art

The number of networked electronic devices such as consumer electronics (CE) devices in home networks is on the rise and so is the amount of data stored therein. Consumers store and access several types of content (e.g., movies, photos, broadcast television (TV), cable TV programs) on/via such devices in their home networks. Further, the amount of information available on the Internet via the World Wide Web is on the rise.

Given the large amount of data/information available on a home network and on the Internet, it is very likely that consumers (users) can find extensive information on the Internet related to at least a portion of the data stored on their home devices. Moreover, many users are as interested in accessing information on the Internet as they are in accessing data on their home networks.

In response to such needs, there have been attempts at providing users with sponsored information that may be of potential interest to users. One conventional approach involves sponsoring web-links based on keywords on the Web, wherein a user of a browser is provided with a list of sponsored web-links on the browser based on search queries entered by the user on an Internet search engine using a keyboard. However, sponsoring web-links based on keywords on the Web is inapplicable to home devices (e.g., CE devices such as TV sets) which typically lack convenient input devices as a keyboard/mouse for text entry, data selection, etc.

The existing approaches do enable sponsors (web site owners) to advertise web-links on web pages, wherein, e.g., sponsored web-links are displayed next to search results or on web pages that use specialized advertising tools. However, the sponsored links are displayed in a way that is most suitable for PC-like devices that have a keyboard and a mouse. Applying such approaches to CE devices, such as TVs that have a remote control type of input device will require the user to perform complex navigation for choosing a sponsored link. As such, there is a need for a method and system for providing relevant information such as sponsored web-links, to users of electronic devices such as CE devices, with simple navigation for accessing such information.

SUMMARY OF THE INVENTION

The present invention provides a method and system for providing sponsored information on an electronic device. In one embodiment this involves: determining information of interest to the user as relevant information, accessing sponsored information, and providing sponsored information based on said relevant information.

In one implementation, determining information of interest to the user involves determining information relevant to content accessed by the user via the electronic device. In another implementation, determining information of interest to the user involves determining information relevant to history of the user interaction with the electronic device. In another implementation, determining information of interest to the user involves determining information relevant to a profile for the user.

In one example, the user is provided with the relevant information and upon selection of information from the relevant information by the user, the sponsored information is provided based on the selected information. In another example, the sponsored information is provided based on said relevant information, without requiring selection of information from the relevant information. The sponsored information can be stored on a server and accessed by the device, or the sponsored information can be downloaded to the device.

The present invention facilitates advertisement of sponsored information such as web-links on electronic devices as in CE devices in home networks. The present invention further facilitates user access to sponsored web-links by enabling simple navigation on typical CE devices that lack input devices such as a keyboard and/or a mouse.

These and other features, aspects and advantages of the present invention will become understood with reference to the following description, appended claims and accompanying figures.

BRIEF DESCRIPTION OF THE DRAWINGS

FIG. 6 shows another example architecture, implemented on a CE device, which facilitates the display of sponsored web-links, according to the present invention.

DETAILED DESCRIPTION

Figure 1:
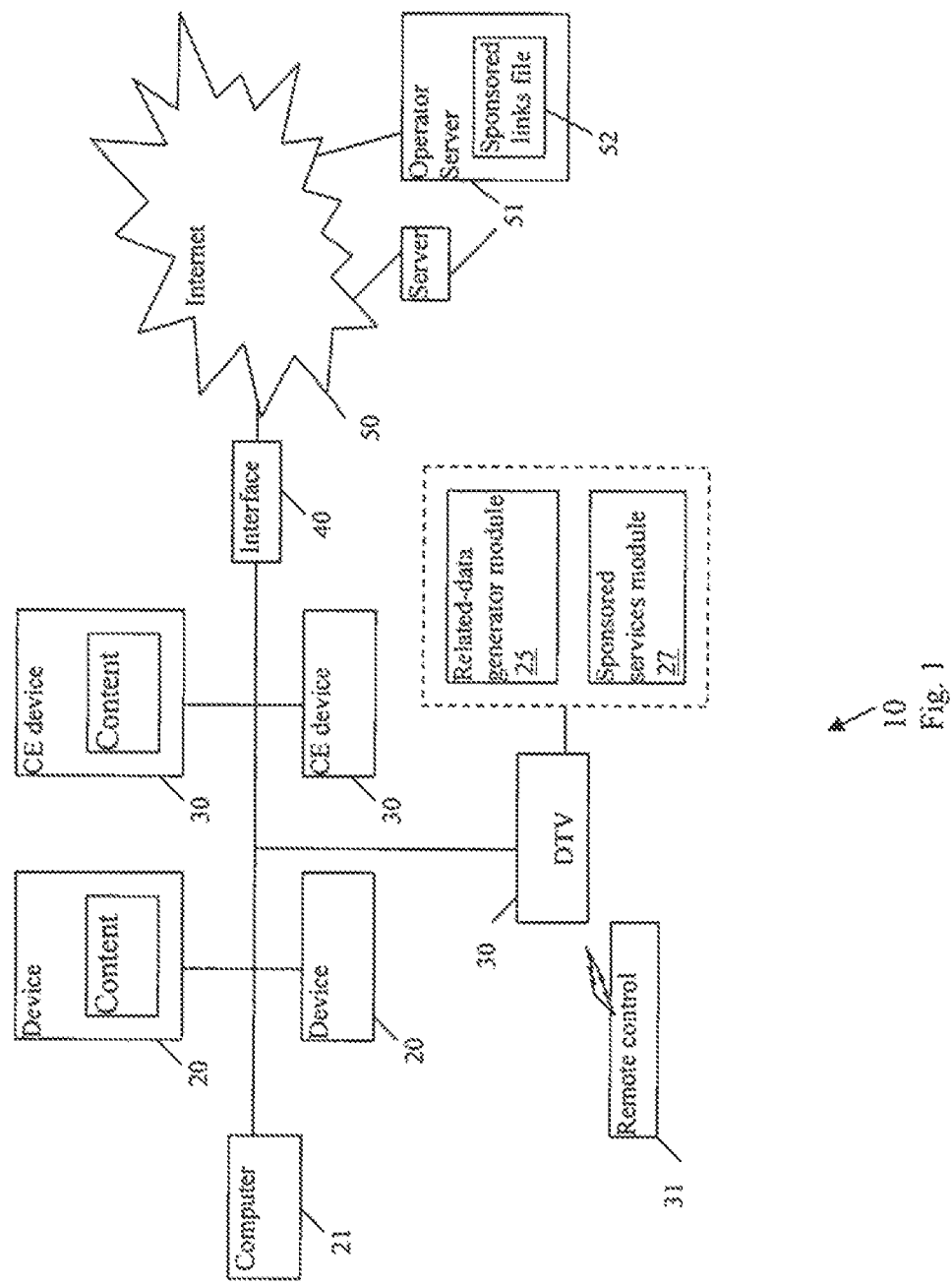
FIG. 1 shows a functional block diagram of a local area network including electronic devices implementing an embodiment of the present invention.

The present invention provides a method and system for providing sponsored information on an electronic device. In one embodiment this involves: determining information of interest to the user as relevant information, accessing sponsored information, and providing sponsored information based on said relevant information.

In one implementation, determining information of interest to the user involves determining information relevant to content accessed by the user via the electronic device. In another implementation, determining information of interest to the user involves determining information relevant to history of the user interaction with the electronic device. In another implementation, determining information of interest to the user involves determining information relevant to a profile for the user.

The relevant information can comprise words, phrases, graphical information, etc. The sponsored information can be web-links, data, hype-links, text, graphics, audio information, visual information, executable program instructions, etc.

In one example, the sponsored information is provided based on said relevant information, without requiring user involvement. In another example, the user is provided with the relevant information and upon selection of information from the relevant information by the user, sponsored information is provided based on the selected information.

An implementation of the latter example is described below, however, other examples are possible as those of ordinary skill in the art will recognize. In one implementation, the present invention enables sponsors to advertise web-links on electronic devices such as CE devices (e.g., entertainment devices as in TVs) in homes. The present invention also facilitates user access to information via typical home electronic devices that lack input devices such as a keyboard or a mouse. The user can access and select the sponsored links with minimal effort (less input and simple navigation). An example implementation that enables advertisement of web-links to home users via home devices such as a TV set is now described.

In order to sponsor web-links, interested sponsors (e.g., Webpage owners, Internet service providers) enter into agreements with an operator to display specific web-links for certain keywords of actual or potential interest to the user of a CE device. For example, the ABC Company can enter into an agreement with an operator (e.g., DEF Company) to display, e.g., the sponsored web-link URL http://www.ABC.com when the keyword "motorcycles" is suggested to the user of a TV in the home network (it is also possible for an operator ABC to sponsor a link such as URL http://www.xyz.com, where the URL does not include the term ABC).

In one example, such keywords (or categories) are suggested to the user by a keyword generator based on one or more factors such as current user activity on the network, context of the user, profile of the user, previous activities of the user, etc. The keywords can be for recorded content that is played back, broadcast videos/TV programs, etc. The user can seamlessly browse/search for related information on the Internet using the suggested keywords as search queries.

The interested sponsors (e.g., webpage owners, Internet service providers) can also enter into agreements with the operator to display dynamic web-links when any keyword of interest is suggested to the user of the CE device. For example, the XYZ Corporation can enter into an agreement with the operator to construct a sponsored dynamic web-link using, e.g., http://www.XYZ.com%keyword% as a template and filling in the % keyword % field in the template with a suggested keyword of interest that is selected by the user, to generate a static web-link for display. As such, if the suggested keyword selected by the user is "Canada", the static web-link http://www.XYZ.com/canada is constructed and displayed.

In one example, information based on the sponsor agreements is maintained on an operator server as a "sponsored links file" containing sponsorship information such as, e.g., keywords and corresponding (sponsored) specific and/or dynamic web-links. In another example, sponsorship information may be requested from an advertising partner directly (e.g., TCP/HTTP socket connection) rather than a file. Other examples of maintaining/obtaining sponsorship information are possible.

In one scenario, when a user is watching a program (e.g., a broadcast or pre-recorded TV program), certain keywords related to the program are suggested to the user. Whenever the user accesses (selects) a suggested keyword related to a currently watched program, the "sponsored links file" on the operator server is accessed to determine if any sponsored links are available for the selected keyword. The sponsored links, if available, are then displayed. Optionally other related web-links that can be obtained through an Internet search engine, are also displayed. The search results and sponsored links can be composed together and displayed as well.

FIG. 1 shows a functional architecture of an example network, such as a local area network (LAN) 10 in a home, embodying aspects of the present invention. The network 10 comprises electronic devices 20 (e.g., appliances) which may include content, a PC 21, CE devices 30 which may include content, and an interface 40 that connects the network 10 to an external network 50 (e.g., data sources, the Internet). The external network 50 is connected to one or more servers 51, including an operator server which maintains a "sponsored links file" 52 as described above.

Though the example described hereinbelow relates to the CE devices 30, the present invention is equally applicable to the devices 20 which may include non-CE devices. One or more devices 30 can implement the Universal Plug and Play (UPnP) protocol for communication therebetween. Though in the example described herein, the UPnP is utilized by the network; those skilled in the art will recognize that the present invention is useful with other network communication protocols (e.g., Jini, HAVi, IEEE 1394). Further the network 10 can be a wireless network such as an IEEE 802.11 type network.

The network 10 further provides a related-data generator module 25 that generates, among other things, keywords related to a program being watched by a user on a CE device 30 such as a digital television (DTV). In another example, the related-data generator module 25 generates keywords based on user history such as a user profile, content previously accessed by the user, etc. The related-data generator module 25 can be implemented, e.g., in a standalone module, in a device 20 such as a set-top box or in a CE device 30 such as a DTV. A user interface (UI) can be displayed on a device in the network 10 capable of displaying information, such as a CE device 30.

The network 10 further includes a sponsored services module 27 configured such that whenever the user accesses (selects) a suggested keyword related to a currently watched TV program, the sponsored services module 27 accesses the "sponsored links file" on the operator server to determine if any sponsored links are available for the selected keyword. The sponsored services module 27 can also be configured to download the sponsored links file from the operator server and accesses the locally stored sponsored links file to determine if any sponsored links are available for the selected keyword.

The sponsored links, if available, are then displayed and are optionally followed by other related web-links that can be obtained through an Internet search engine. The sponsored services module 27 can be implemented, e.g., in a standalone module, in a device 20 such as a set-top box or in a CE device 30 such as a DTV.

Figure 2:
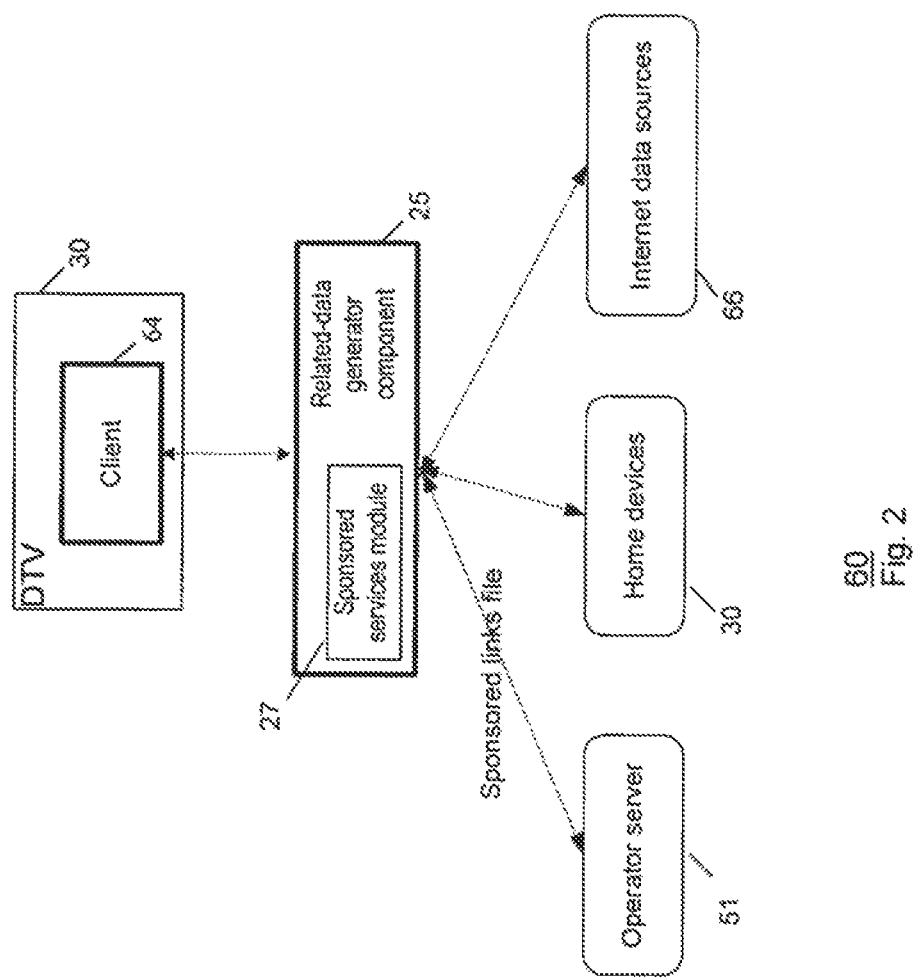
FIG. 2 shows an example architecture which facilitates the display of sponsored web-links via a client module implemented on a CE device, according to the present invention.

FIG. 2 shows a preferred architecture 60 in which the sponsored services module 27 is a component of the related-data generator module 25. The architecture 60 provides support for displaying sponsored web-links via a client module 64 that in this example is implemented in a CE device such as a DTV 30. The client module 64 enables a user to request more information from Internet data sources 66 about the TV program the user is watching. An example of the client module 64 is described in related U.S. patent application Ser. No. 11/713,350, filed Mar. 1, 2007, entitled "A Method and System For Providing a User Interface Application and Presenting Information Thereon", incorporated herein by reference.

Figure 3:
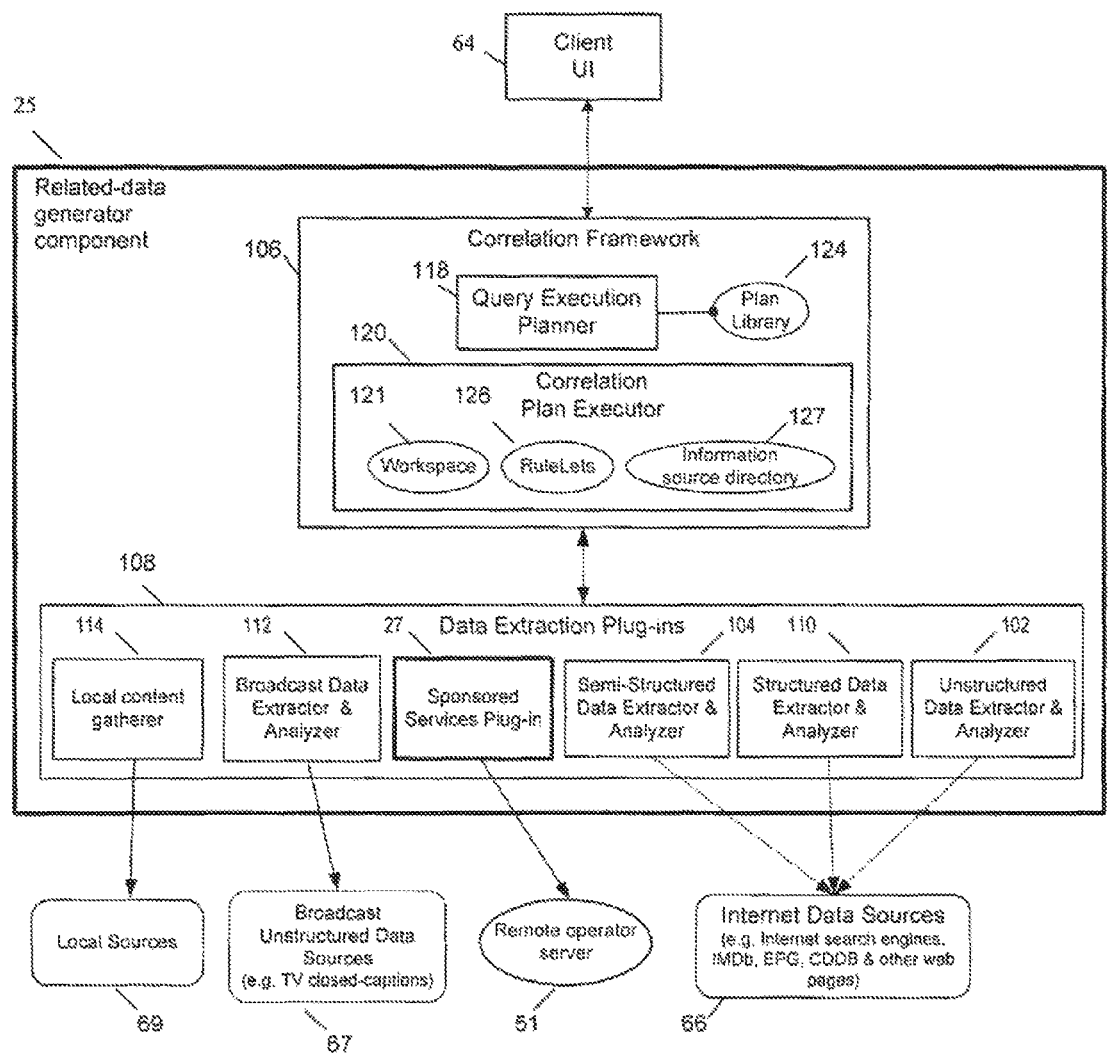
FIG. 3 shows an implementation of the architecture in FIG. 2 for displaying sponsored web-links, according to an embodiment of the present invention.

FIG. 3 shows an implementation of the architecture 60 for displaying sponsored web-links, wherein the related-data generator component 25 is configured for TV hardware or a set-top box platform. The client module 64 enables a user to request more information from the Internet data sources 66 about the TV program the user is watching. The related-data generator component 25 includes a Correlation Framework (CF) 106 and a Data Extraction Plug-ins (DEP) 108, wherein the DEP 108 comprises a Sponsored Services Plug-in 27 that implements a sponsored services module according to an embodiment of the present invention.

The CF 106 provides interfaces and functionalities for use by the client module 64 to resolve user requests for various types of local and Internet information. The CF 106 includes a Query Execution Planner (QEP) 118, a Plan Library 124, a Correlation Plan Executor (CPE) 120, one or more RuleLets 126 and an Information Source Directory 127.

A plan-step in a plan specifies the RuleLet to be executed, and also optionally specifies the type of required data and scope of the output-data (e.g., whether the data required should be on the Internet or on the home devices). The RuleLets 126 are specialized processes that execute a specific task (e.g., obtaining keywords related to a TV program, obtaining Internet links containing the biography of an artist). The workspace 121 is used by the CF 106 to temporarily store the results of executing each plan-step in a plan, for input to subsequent steps as needed. The Information Source Directory 127 maintains information about which data extraction plug-in should be used to extract a particular type of data.

The QEP 118 provides interfaces between the client module 64 and the functions of the CF 106. The Plan Library 124 includes various plans described in simple XML-like format. Each QEP interface is associated with a particular plan; when an interface is executed, the QEP 118 passes on the associated plan to the CPE 120 along with any data passed on by the client (user). The CPE 120 executes the plan passed on by the QEP 118 using the DEP 108. A plan specifies the steps to be executed in order to resolve a particular type of query. An example of the CF 106 is described in related U.S. patent application Ser. No. 11/726,340, filed Mar. 21, 2007, entitled "A Framework for Correlating Content on a Local Network with Information on an External Network," incorporated herein by reference.

The DEP 108 provides functionalities to extract data from different sources including the home devices (media) repository and the Internet. The DEP 108 includes a Sponsored Services Plug-in 27, an Unstructured Data Extractor & Analyzer 102, a Semi-Structured Data Extractor & Analyzer 104, a Structured Data Extractor & Analyzer 110, a Broadcast Data Extractor & Analyzer 112 and a Local Content Gatherer 114.

The Unstructured Data Extractor & Analyzer 102 provides functionalities to extract data from general websites on the Internet via Internet search engines such as Google, Yahoo, etc. The Unstructured Data Extractor & Analyzer 102 passes on the keyword chosen by the user/client to a search engine (e.g., API provided by the 'Yahoo!' search engine) to obtain related web-links for the keyword. The Semi-Structured Data Extractor & Analyzer 104 provides functionalities to extract data from Internet sources (such as zap2it) that provide semi-structured data (e.g., an electronic program guide (EPG), the Internet Movie Database (IMDb)). The Structured Data Extractor & Analyzer 110 provides functionalities to extract data from Internet sources (e.g., a compact disk database (CDDB)) that provide structured music metadata. The Broadcast Data Extractor & Analyzer 112 provides functionalities to extract and analyze closed-caption data from broadcast TV programs using Broadcast Unstructured Data Sources 67. The Local Content Gatherer 114 provides functionalities to extract and aggregate content (audio, video) available on Local Sources 69 (e.g., meta-data information on one or more home devices).

The sponsored services module 27 is implemented as a plug-in (Sponsored Services Plug-in) which provides functionalities to obtain data available on a remote server 51 managed by said operator, wherein such data includes sponsored web-links maintained in a sponsored links file, according to an embodiment of the present invention. The Sponsored Services Plug-in 27 contacts the operator server 51 to obtain the "sponsored links" file 52. Whenever keywords are displayed to a user by the client module 64, the Sponsored Services Plug-in 27 extracts the sponsored web-links for the keyword highlighted by the user from "sponsored links" file 52 and passes them onto the client module 64 via the CF 106 for display to the client.

In this example, the client module 64 is implemented in the DTV 30 in FIG. 1. When a user presses the "Info" button on the DTV remote control 31 (while watching a TV program on the DTV 30), the client module 64 (i.e., the Keyword Menu generator module) requests the QEP 118 for keywords related to the TV program (e.g., the client module 64 invokes a getRelatedKeywords( ) interface in the QEP 118 for keywords). Consequently, the QEP 118 looks to its Plan Library 124 to identify the appropriate plan to execute in order to resolve the request from the client module 64. An example of an identified plan is getRelatedKeywords.xml in Table 1 below:

TABLE 1 getRelatedKeywords.xml
<?xml version="1.0" ?>
<plan>
  <planstep>
    <RuleLet>GetDataRule</RuleLet>
    <OutputType>CCKeywords</OutputType>
    <Scope>Local</Scope>
  </planstep>
</plan>

The QEP 118 then passes on the above-identified plan to the CPE 120 for execution. The plan triggers the invocation of a RuleLet (e.g., "GetDataRuleLet"). Based on the output type set in the plan (e.g., "CCKeywords"), the GetDataRuleLet first identifies (from the Information Source Directory 127) that the Broadcast Data Extractor & Analyzer 112 is to be used to extract the required data. Then, a query object is constructed using the fields in the plan and any input parameters passed on by the QEP 118. The constructed query object has the following fields: with input set as "none", output set as "CCKeywords" and scope set as "local". Then, the CPE 120 passes on the query object to the Broadcast Data Extractor & Analyzer 112 which returns a list of keywords to the CPE 120. The keywords are related to the currently broadcasted TV program. An example of the Broadcast Data Extractor & Analyzer 112 and extracting keywords is provided in the related U.S. application Ser. No. 11/789,609, filed on Apr. 25, 2007, entitled "Method and System for Providing Access to Information of Potential Interest to a User," incorporated herein by reference.

The CPE 120 returns this list of keywords to the client module 64 through the QEP 118. On receiving the list of keywords, the client module 64 (i.e., the Search Results menu generator) requests the QEP 118 for the Internet search results related to the first keyword on the list. For example, the client module 64 invokes a getRelatedInternetLinks( ) interface of the QEP 118 with the first keyword (e.g., "keyword-a") as the input parameter for the interface. Consequently, the QEP 118 looks to its Plan Library 124 to identify the appropriate plan to execute (e.g., getRelatedInternetLinks.xml) in order to resolve the request. The getRelatedInternetLinks.xml plan is shown in Table 2 below:

TABLE 2

```
getRelatedInternetLinks xml
  <?xml version="1.0" ?>
  <plan>
    <planstep>
      <RuleLet>GetDataRule</RuleLet>
        <OutputType>SponsoredLinks</OutputType>
        <Scope>OperatorServer</Scope>
    </planstep>
    <planstep>
      <RuleLet>GetDataRule</RuleLet>
        <OutputType>SearchResults</OutputType>
        <Scope>Internet</Scope>
    </planstep>
    <planstep>
      <RuleLet>MergeDataRule</RuleLet>
        <InputType>OperatorServer-SponsoredServices</InputType>
        <InputType>Internet-SearchResults</InputType>
      <OutputType>InternetLinks</OutputType>
        <Scope>CIWorkspace</Scope>
    </planstep>
```

The QEP 118 passes the plan in Table 2 to the CPE 120 for execution. The first step in the plan triggers the invocation of a RuleLet (e.g., "GetDataRuleLet"). Based on the output type set in the plan step (i.e., "SponsoredLinks"), the GetDataRuleLet first identifies (from the Information Source Directory 127) that the Sponsored Services Plug-in 27 is to be used to extract the required data. Then, a query object is constructed using the fields in the plan and any input parameters passed on by the QEP ("keyword-a" in this case). The constructed query object has the following fields: input set as "keyword-a", output type set as "SponsoredLinks" and scope set as "OperatorServer". Then the CPE 120 passes on the query object to the Sponsored Services Plug-in 27. The Sponsored Services Plug-in 27 obtains all available sponsored links for the keyword passed as input (i.e., "keyword-a") from a sponsored links file maintained by a remote operator server 51.

The CPE 120 stores the obtained list of sponsored links in its workspace 121 with a type set as "OperatorServerSponsoredServices" and executes the next step in the plan in Table 2 described above. The second step in the plan triggers the invocation of the "GetDataRuleLet" again. Based on the output type and scope set in the plan step (e.g., "SearchResults" and "Internet" in this case), the GetDataRuleLet identifies (from the Information Source Directory 127) that the Unstructured Data Extractor & Analyzer plug-in 102 is to be used to extract the required data. Then, a query object is constructed using the fields in the plan and any input parameters passed on by the QEP 118 (i.e., "keyword-a"). The constructed query object has the following fields: input set as "keyword-a", output set as "SearchResults" and scope set as "Internet". Then, the CPE 120 passes on the query object to the Unstructured Data Extractor & Analyzer plug-in 102 which queries a search engine with the keyword passed as input ("keyword-a"), and provides to the CPE 120 search results returned by the search engine. In one example, the Yahoo search engine is used to obtain the top 20 search results for a keyword.

The CPE 120 stores the search results in its workspace 121 with the type set as "Internet-SearchResults" and executes the next step in the plan in Table 2. The second step in the plan triggers the invocation of the "MergeDataRuleLet". Based on inputTypes set in the plan-step, the MergeDataRuleLet retrieves the data with type "OperatorServerSponsoredServices" and data with type "InternetSearchResults" from the workspace 121, merges them and passes the merged result (i.e., a list of Internet links including sponsored links and search results) to the client module 64 (via the CPE 120 and the QEP 118).

Upon receiving the merged results, including a list of Internet links comprising sponsored links and search results, the client module 64 displays the list of Internet links on a user interface with the list of keywords related to the TV program, and the related Internet links.

If the user selects a different keyword from the list of keywords related to the currently broadcasted TV program (i.e., the list of keywords returned above by the Broadcast Data Extractor & Analyzer plug-in 112), the client module 64 (i.e., the Search Results menu generator) requests the QEP 118 for Internet search results for the currently selected keyword. For example, the client module 64 invokes a getRelatedInternetLinks( ) interface of the QEP 118 with the currently selected keyword as the input parameter for the interface. Then, the QEP 118 with the assistance of the CPE 120 and the DEP 108 (e.g., Sponsored Services Plug-in 27), through similar steps described above, returns search results including Internet links including sponsored links and search results for the currently selected keyword to the client module 64 for display.

Figure 4:
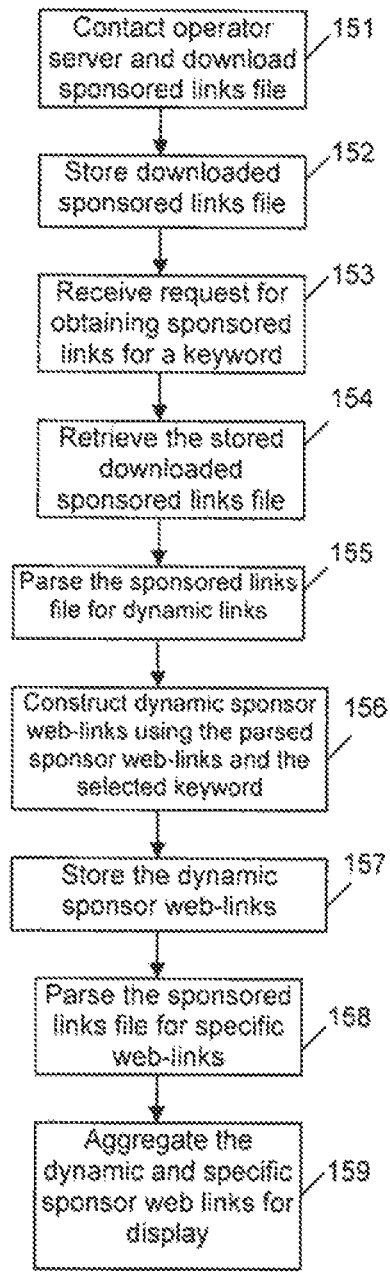
FIG. 4 shows a flowchart of the steps of a sponsored services process for displaying sponsored web-links, according to an embodiment of the present invention.

FIG. 4 shows a flowchart of the steps of a process 150 implemented by the Sponsored Services Plug-in 27, according to an embodiment of the present invention, including the steps of:

Step 151. The sponsored services plug-in contacts the operator server to download the latest sponsored links file. An example of a sponsored links file in simple text (SponsoredLinks.txt) is shown in Table 3 below.

TABLE 3

SponsoredLinks.txt
SponsoredLinks.txt#
Dynamic Links
More on Answers.com, http://www.answers.com/#query#
Books
Amazon, http://www.amazon.com
Barnes & Noble, http://www.bn.com
Motorcycle
Harley-Davidson,
http://www.harley-davidson.com
Milwaukee Tools, http://www.milwaukeetool.com
keyword-a
Sample sponsor,
http://www.keyword-asponsor.com There can be priorities or probabilities associated with the sponsored links as candidates for display selection purposes. Also there can be different types of sponsorship: priority increase of certain results; inserting web links as well as video sponsorship. Further, there may be sponsorship based on the entire content accessed (e.g., SuperBowl).

Step 152. The sponsored services plug-in stores the downloaded sponsored links file in a local cache (or updates it with the latest file if a periodic download). The file need not be downloaded, and may be queried directly on the server.

Step 153. The sponsored services plug-in receives a request for obtaining sponsored links for a keyword selected (chosen by the user (i.e., a selected keyword) via the client module 64.

Step 154. The sponsored services plug-in retrieves the sponsored links file from its cache.

Step 155. The sponsored services plug-in parses the sponsored links file to retrieve the details (web-link and title) for the sponsors providing, e.g., dynamic web-links. In one example, the sponsored services plug-in searches for the word "dynamic" in the sponsored links file and reads the lines following the word "dynamic" until it encounters a blank line.

Step 156. The sponsored services plug-in constructs dynamic sponsor links using the sponsor web-links retrieved in step 155 and the selected keyword. In one example, this step is repeated for all the sponsor links retrieved in step 155 (essentially all the links provided under the "dynamic" keyword in the sponsored links file), one or more of which are displayed as candidates based on priority or other criteria.

Step 157. The sponsored services plug-in locally stores the dynamic sponsor links constructed. The sponsorship results (i.e., the sponsorship file) may be different for each network, demographics or location.

Step 158. The sponsored services plug-in continues parsing the sponsored links file to retrieve any specific sponsor links available for the selected keyword. In one example, the plug-in basically searches for the selected keyword in the sponsored links file; if it finds the keyword, it reads all the lines following the keyword until it encounters a blank line.

Step 159. The sponsored services plug-in aggregates the constructed dynamic sponsor web-links and retrieved specific web-links, and passes the aggregate to a user interface component to display it to the user. In one example, the sponsored services plug-in passes the aggregate to the CPE 120 to provide to the client module 64 for display to the user.

The sponsored links file essentially includes a list of keywords and corresponding Internet links (along with titles). Each keyword is followed by one or more Internet website links along with the title of the web page. It may also contain (as is the case with the SponsoredLinks.txt above) one or more dynamic sponsor links. In this example, the dynamic sponsor link has the format: http://www.sponsor.com/#query# wherein "sponsor" is the sponsoring entity (It is also possible for an operator ABC to sponsor a link such as http://www.xyz.com where the URL does not include the term ABC).

Dynamic sponsor links are dynamic links that are displayed for all keywords, by replacing the sequence of characters "#query#" in the sponsored dynamic link with the actual keyword (e.g., for the keyword "keyword-a", the Sponsored Services Plug-in 27 constructs the dynamic sponsor link http://www.answers.com/keyword-a for the sponsoring entity answers.com). In another example, if the selected keyword is "motorcycles", the sponsored services plug-in replaces the "#query#" phrase in the sponsor link: http://www.answers.com/#query# and constructs http://www.answers.com/motorcycles as a dynamic sponsor link.

The Sponsored Services Plug-in 27 periodically contacts the operator server 51 (e.g., once per day) to download the latest sponsored links file (e.g., via a wget operation). The Sponsored Services Plug-in 27 stores the downloaded file in a local cache and updates it with the latest file that it downloads periodically. In one example, the Sponsored Services Plug-in 27 is initialized with the IP address of the operator server 51 and the path to the sponsored links file 52 therein.

When the Sponsored Services Plug-in 27 receives a request from the CPE 120 to return sponsored links for a particular keyword, the Sponsored Services Plug-in 27 first retrieves the dynamic sponsors (and related links) from the sponsored links file and constructs the dynamic sponsor links as discussed above. In the above example, the sponsored links file "SponsoredLinks.txt" in Table 3, the link {Answers.com, http://www.answers.com/keyword-a} is constructed and is added to a list of sponsored links ("sLinks").

Then, the Sponsored Services Plug-in 27 looks through the sponsored links file for the keyword "keyword-a". If that keyword is found, the Sponsored Services Plug-in 27 retrieves the related sponsor links (e.g., by reading all the links following the keyword until a blank line is encountered). In this case, as the keyword is "keyword-a", the {Sample sponsor, http://www.keyword-asponsor.com} line is read and added to the list "sLinks" In another example, if the selected keyword is: "motorcycles", the plug-in would read the following two lines from the sponsored links file: Harley-Davidson, http://www.harley-davidson.com and Milwaukee Tools, http://www.milwaukeetool.com, and places them in the list of sponsored links ("sLinks"). The final list of sponsored links ("sLinks") is then returned to the CPE 120 to pass onto the client module 64 for display.

The data format of the sponsored links file is not limited to a plain text file, and can be of other formats such as HTML, XML, a table, etc. Further, the sponsored links plug-in can download the sponsored links file from the operator server by ftp, smbclient or any other suitable operation. The sponsored links file could be downloaded only when there is a request from the CPE 120 for sponsored links, or can be downloaded/updated once in a week or month or year (instead of once in a day).

The following is an example scenario involving a user, John, watching a TV program on the DTV 30, according to the present invention:

1. John powers on his DTV and starts watching the Program "American Choppers" on the Discovery channel that has closed-captions. The closed-captions are used to identify keywords related to the TV program.
2. John presses the Info button on the DTV's Remote Control (RC).
3. The client module on the DTV passes on John's request to the related-data generator component (FIG. 3). The request includes information conveying that John is interested in accessing Internet information related to the TV program. This is done by mapping the Info key to a particular API of the related-data generator component. For example, pressing the Info key triggers invocation of the API getRelatedKeywords( ) interface supported by the QEP.
4. The related-data generator component identifies keywords related to the program that John is watching and returns them to the client module. For example, the Broadcast Data Extractor & Analyzer identifies keywords related to the currently broadcasted TV program.
5. The client module displays the following example keywords: American Choppers, motorcycles, Paul Sr., etc.
6. John chooses the keyword "motorcycles", and the client module passes on the keyword to the related-data generator module (e.g., by invoking a getRelatedInternetLinks(keyword) interface of the QEP).
7. The Sponsored Services Plug-in of the related-data generator component contacts the operator server to obtain the sponsored links file. Then the Sponsored Services Plug-in checks if there are any sponsored web-links available for the keyword selected by John.
8. From the sponsored links file, the Sponsored Services Plug-in retrieves the sponsored link: [Harley-Davidson Motorcycle, http://www.Harley-Davidson.com], and constructs a dynamic sponsored link: [Answers.com: Motorcycles, http://www.answers.com/motorcycles] for the keyword "motorcycles". There is only one direct entry (e.g., Harley-Davidson) for the keyword Motorcycle. But the other link (Answers.com) is constructed from the dynamic sponsor link by replacing "#query#" with "motorcycle".
9. The Sponsored Services Plug-in also identifies more related web-links for the selected keyword through an Internet search engine, and creates a list of Internet web-links with the sponsored links at the top and the search engine results at the bottom. The Sponsored Services Plug-in passes on this list to the client module. The related web-links are Internet links that are related to the selected keyword. The Unstructured Data Extractor & Analyzer obtains search results including the related web-links from search engines. As such, related web-links are displayed to the user in addition to the sponsored web links obtained based on the sponsored links file.
10. Finally, the client module displays the list of sponsored web-links and related web-links. Since John was looking to buy a motorcycle, he is happy to see the Harley-Davidson sponsor link at the top of the list and may select it to initiate/investigate a motorcycle from the sponsor Harley-Davidson.

The present invention facilitates user access to the sponsored links and related links with minimal effort (less input and simple navigation). With the press of a button, John was able to see a list of sponsored web-links and related web-links. Thus, one logical application of the present invention is for CE devices and electronic devices that lack input devices such as a keyboard and a mouse, as found in typical home entertainment devices.

Further, in place of or in addition to static/dynamic link matching, it is also possible to:
a) present sponsored information (e.g., advertisement) to the user based on a viewed program itself;
b) present sponsored information (e.g., advertisement) based on a genre;
c) present a set of keywords/keyphrases/keyinformation to the CF (with a set of weighting) and have the client fill them in probabilistically based on multiple requests;
d) match/select sponsorship information for display based on user profile items (e.g., user likes reality TV, over 18 years old, etc.), etc.

Figure 5:
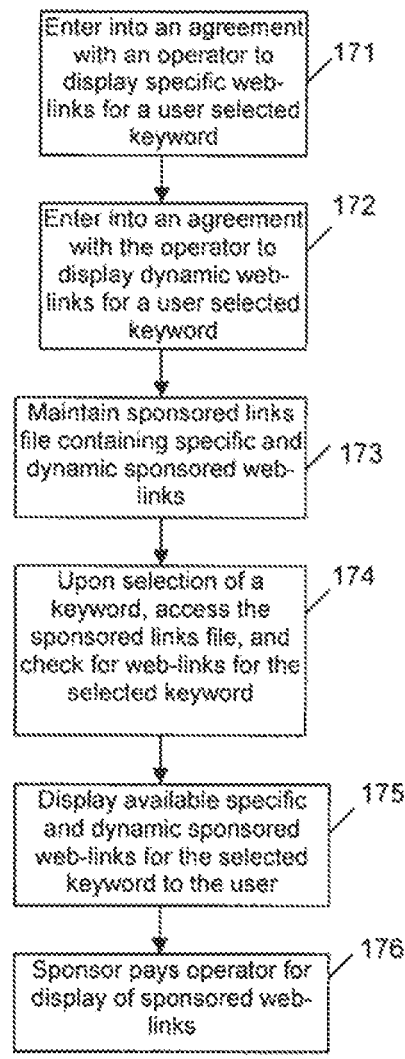
FIG. 5 shows an example business model according to the present invention.

The present invention also provides a business model based on sponsoring web-links that are processed by home entertainment devices, and that are relevant to the content/data the home user is accessing. Referring to the example flowchart of a process 170 in FIG. 5, the present invention enables advertisement of relevant web-links to home users via home devices such as a TV set, including the steps of:

Step 171: Interested sponsors such as web page owners and Internet service providers enter into an agreement with an operator to display specific web-links when certain keywords are suggested to the user by a keyword generator (e.g., the related-data generator component).

Step 172: Interested sponsors such as web page owners and Internet service providers enter into an agreement with the operator to display dynamic web-links when any keyword is suggested to the user by a keyword generator (e.g., the related-data generator component).

Step 173: A sponsored links file containing keywords and corresponding (sponsored) web-links per the sponsor agreements, is maintained on an operator server.

Step 174: Whenever a user selects a keywords related to a program (e.g., a currently watched TV program), the sponsored services module accesses the sponsored links file from the operator server and checks if there are any sponsored web-links available for the currently selected keyword.

Step 175: Display available specific and dynamic sponsored web-links for the selected keyword to the user, optionally followed by other web-links related to the selected keyword, which are obtained through an Internet search engine.

Step 176: As part of the agreement, a sponsor agrees to pay the operator each time a web-link sponsored by that sponsor is shown to the user or by the operator, or selected by the user.

Other compensation examples are possible. Further, in addition to, or in place of the sponsored web-links, the sponsored link file 52 may include other advertising information for, or certain tasks executed on behalf of a sponsor when certain keywords are selected by the user. Further, although the sponsored web-links can be from advertisers with commercial interest, the present invention is useful for displaying multiple types of sponsored information (e.g., web-links, text, video, audio) whether or not commercial, upon user selection of a keyword related to content (e.g., a TV program) accessed by a user on an electronic device (e.g., a DTV).

Further, although in the above examples the electronic devices have been described as being part of a local network, the present invention is also useful with electronic devices that are not on a local network. For example, the DTV 30 in FIG. 2 need not be connected in a local network. Instead, as shown by the example architecture 180 in FIG. 6, the related-data generator 25 and the client module 64 are implemented in the DTV 30 in the home, wherein the DTV 30 is connected to the Internet data sources 66 and the operator server 51, without needing a network connection to other CE devices that may be in the home.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A computer implemented method for displaying sponsored information on an electronic device, comprising:
   determining at least one suggested keyword based on activity on the electronic device, wherein each suggested keyword represents a potential interest;
   generating a user interface including the at least one suggested keyword;
   displaying the user interface on the electronic device;
   receiving a selection of a keyword selected from the user interface displayed on the electronic device;
   accessing a file comprising multiple keywords and multiple pieces of sponsored information, wherein each piece of sponsored information corresponds to a keyword of the multiple keywords; and
   parsing the file for one or more pieces of sponsored information corresponding to the selected keyword by:
      parsing the file for one or more sponsor web links available for the selected keyword; and
      generating sponsorship information for the selected keyword based on the one or more sponsor web links;
   wherein the user interface displayed on the electronic device is updated to include the selected keyword and the sponsorship information for the selected keyword.

2. The method of claim 1, wherein:
   the file is maintained on an operator server;
   each piece of sponsored information includes at least one of the following: a static web link, a dynamic web link, text, a piece of audio content, and a piece of video content; and
   each piece of sponsored information is associated with a sponsor that the operator server entered into a sponsor agreement with.

3. The method of claim 2, wherein:
   a sponsor is one of a web page owner and an Internet service provider.

4. The method of claim 2, wherein accessing the file comprises:
   downloading the file from the operator server.

5. The method of claim 4, wherein:
   the downloaded file is downloaded to, and accessed by, one of the following: a standalone module, a set-top box, and a module residing on the electronic device.

6. The method of claim 2, wherein:
   based on a sponsor agreement between the operator server and a sponsor, the sponsor pays the operator server each time a piece of sponsored information associated with the sponsor is displayed on the electronic device or selected at the electronic device.

7. The method of claim 1, further comprising:
   identifying at least one related web-link for the selected keyword via an Internet search engine.

8. The method of claim 7, further comprising:
   creating a list including each piece of sponsored information corresponding to the selected keyword and the at least one related web-link, wherein the list is included in the user interface displayed on the electronic device.

9. The method of claim 1, wherein:
   the at least one suggested keyword is determined via one of the following: a standalone module, a set-top box, and a module residing on the electronic device.

10. The method of claim 1, wherein parsing the file for one or more pieces of sponsored information corresponding to the selected keyword comprises:
   parsing the file for a sponsor web link;
   constructing a dynamic web link based on the sponsor web link and the selected keyword;
   parsing the file for a static web link; and
   generating sponsorship information for the selected keyword by aggregating the dynamic web links and the static web link.

11. A system, comprising:
   a processor; and
   a memory storing instructions that when executed by the processor cause the processor to perform operations including:
      determining at least one suggested keyword based on activity on the electronic device, wherein each suggested keyword represents a potential interest;
      generating a user interface including the at least one suggested keyword;
      displaying the user interface on the electronic device;
      receiving a selection of a keyword selected from the user interface displayed on the electronic device;
      accessing a file comprising multiple keywords and multiple pieces of sponsored information, wherein each piece of sponsored information corresponds to a keyword of the multiple keywords; and
      parsing the file for one or more pieces of sponsored information corresponding to the selected keyword by:
         parsing the file for one or more sponsor web links available for the selected keyword; and
         generating sponsorship information for the selected keyword based on the one or more sponsor web links;
      wherein the user interface displayed on the electronic device is updated to include the selected keyword and the sponsorship information for the selected keyword.

12. The system of claim 11, wherein:
   each piece of sponsored information includes at least one of the following: a static web link, a dynamic web link, text, a piece of audio content, and a piece of video content; and
   each piece of sponsored information is associated with a sponsor that the operator server entered into a sponsor agreement with.

13. The system of claim 12, wherein:
   a sponsor is one of a web page owner and an Internet service provider.

14. The system of claim 12, wherein:
   based on a sponsor agreement between the operator server and a sponsor, the sponsor pays the operator server each time a piece of sponsored information associated with the sponsor is displayed on the electronic device or selected at the electronic device.

15. The system of claim 11, wherein accessing the file comprises:
   downloading the file from the operator server.

16. The system of claim 15, wherein:
   the downloaded file is downloaded to, and accessed by, one of the following: a standalone module, a set-top box, and a module residing on the electronic device.

17. The system of claim 11, wherein:
   the at least one suggested keyword is determined via one of the following: a standalone module, a set-top box, and a module residing on the electronic device.

18. The system of claim 11, wherein the operations further include:
   identifying at least one related web-link for the selected keyword via an Internet search engine; and creating a list including each piece of sponsored information corresponding to the selected keyword and the at least one related web-link, wherein the list is included in the user interface displayed on the electronic device.

19. A non-transitory computer-readable storage medium embodied thereon instructions being executable by at least one processor to perform a method for displaying sponsored information on an electronic device, the method comprising:
determining at least one suggested keyword based on activity on the electronic device, wherein each suggested keyword represents a potential interest;
generating a user interface including the at least one suggested keyword;
displaying the user interface on the electronic device;
receiving a selection of a keyword selected from the user interface displayed on the electronic device;
accessing a file comprising multiple keywords and multiple pieces of sponsored information, wherein each piece of sponsored information corresponds to a keyword of the multiple keywords; and
parsing the file for one or more pieces of sponsored information corresponding to the selected keyword by:
parsing the file for one or more sponsor web links available for the selected keyword; and
generating sponsorship information for the selected keyword based on the one or more sponsor web links;
wherein the user interface displayed on the electronic device is updated to include the selected keyword and the sponsorship information for the selected keyword.

20. The computer-readable storage medium of claim 19, wherein:
the file is maintained on an operator server;
each piece of sponsored information includes at least one of the following: a static web link, a dynamic web link, text, a piece of audio content, and a piece of video content; and
each piece of sponsored information is associated with a sponsor that the operator server entered into a sponsor agreement with.

* * * * *